US012651374B2

(12) United States Patent
Zhu et al.

(10) Patent No.: US 12,651,374 B2
(45) Date of Patent: Jun. 9, 2026

(54) UNIFIED TRANSFORMER-BASED VISUAL PLACE RECOGNITION FRAMEWORK

(71) Applicant: Lemon Inc., Cayman Islands (KY)

(72) Inventors: Sijie Zhu, Los Angeles, CA (US);
Linjie Yang, Los Angeles, CA (US);
Xiaohui Shen, Los Angeles, CA (US);
Heng Wang, Los Angeles, CA (US)

( * ) Notice: Subject to any disclaimer, the term of this patent is extended or adjusted under 35 U.S.C. 154(b) by 426 days.

(21) Appl. No.: 18/296,438

(22) Filed: Apr. 6, 2023

(65) Prior Publication Data

US 2024/0338848 A1 Oct. 10, 2024

(51) Int. Cl.
*G06T 7/73* (2017.01)
*G06V 10/75* (2022.01)
*G06V 10/77* (2022.01)
*G06V 10/774* (2022.01)

(52) U.S. Cl.
CPC .............. *G06T 7/74* (2017.01); *G06V 10/751* (2022.01); *G06V 10/7715* (2022.01); *G06V 10/774* (2022.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 12,164,559 | B2 * | 12/2024 | Weinzaepfel | ............ G06N 3/08 |
| 2023/0021996 | A1 * | 1/2023 | Lassance | ............... G06N 3/047 |
| 2023/0106141 | A1 * | 4/2023 | Kalantidis | .............. G06N 3/084 |
| | | | | 706/15 |
| 2023/0237773 | A1 * | 7/2023 | Li | .......................... G06F 40/126 |
| | | | | 382/155 |
| 2024/0288995 | A1 * | 8/2024 | Short | .................... G06F 16/583 |

OTHER PUBLICATIONS

Cao et al., "Unifying Deep Local and Global Features for Image Search," arXiv:2001.05027v4 [cs.CV] Sep. 15, 2020 (Year: 2020).*
Song et al., "Boosting vision transformers for image retrieval," arXiv:2210.11909v1 [cs.CV] Oct. 21, 2022 (Year: 2022).*

* cited by examiner

*Primary Examiner* — Soo Shin
(74) *Attorney, Agent, or Firm* — Fish & Richardson P.C.

(57) ABSTRACT

A unified place recognition framework handles both retrieval and re-ranking with a unified transformer model. The re-ranking modules utilizes feature correlation, attention value, and x/y coordinates into account, and learns to determine whether an image pair is from a same location.

16 Claims, 6 Drawing Sheets

100

GLOBAL RETRIEVAL MODULE
10

400

RECEIVE QUERY
405

LINEARIZE PATCHES
410

ENCODE TOKENS
415

LINEARIZE ENCODED TOKENS
420

TRAIN GLOBAL RETRIEVAL TRANSFORMER
425

TRAIN RE-RANKING MODULE
427

430

400

500

UNIFIED TRANSFORMER-BASED VISUAL PLACE RECOGNITION FRAMEWORK

TECHNICAL FIELD

The embodiments described herein pertain generally to a unified framework, the training thereof, and implementation thereof for visual place recognition.

BACKGROUND

Visual place recognition (VPR) is a technology by which a query image for which a location is not provided is localized by matching the query image with reference images for which respective locations are known. Conventional implementations for visual place recognition generally utilize aggregated convolutional neural network (CNN) features for global retrieval of reference images and random sample consensus (RANSAC)-based geometric verification for re-ranking the reference images.

SUMMARY

In one example embodiment, a unified transformer-based visual place recognition (VPR) training framework includes a trainable feature retrieval transformer module that extracts global features and local features from a query image, extracts global features and local features from references images, and trains a global retrieval transformer based on the extracted global features from the query image and the extracted global features from the reference images. The VPR training framework also includes a trainable re-ranking transformer module that trains at least one re-ranking transformer based on the extracted local features from the query image and the extracted local features from the reference images.

In accordance with at least one other example embodiment, a method of training a unified transformer-based visual place recognition (VPR) framework includes encoding linear representations of portions of a query image, encoding a randomly initiated class token of the query image, encoding linear representations of portions of a reference image, encoding a randomly initiated class token of the reference image, training a global retrieval transformer based on the encoded class token of the query image and the encoded class token of the reference image, and training at least one re-ranking transformer based on at least a portion of the encoded linear representations of portions of the query image and a portion of the encoded linear representations of the reference image.

In accordance with at least one other example embodiment, a unified global retrieval and re-ranking framework for implementing visual place recognition (VPR) includes a global retrieval module that is trained by an encoded class token having global features of a query image and by an encoded class token having global features of a reference image and a re-ranking module that is trained by encoded patch tokens having local features of the query image and by encoded patch tokens having local features of the reference image.

BRIEF DESCRIPTION OF THE DRAWINGS

In the detailed description that follows, embodiments of a unified transformer-based visual place recognition (VPR) training framework are described as illustrations only since various changes and modifications will become apparent to those skilled in the art from the following detailed description. The use of the same reference numbers in different figures indicates similar or identical items.

DETAILED DESCRIPTION

Figure 1:
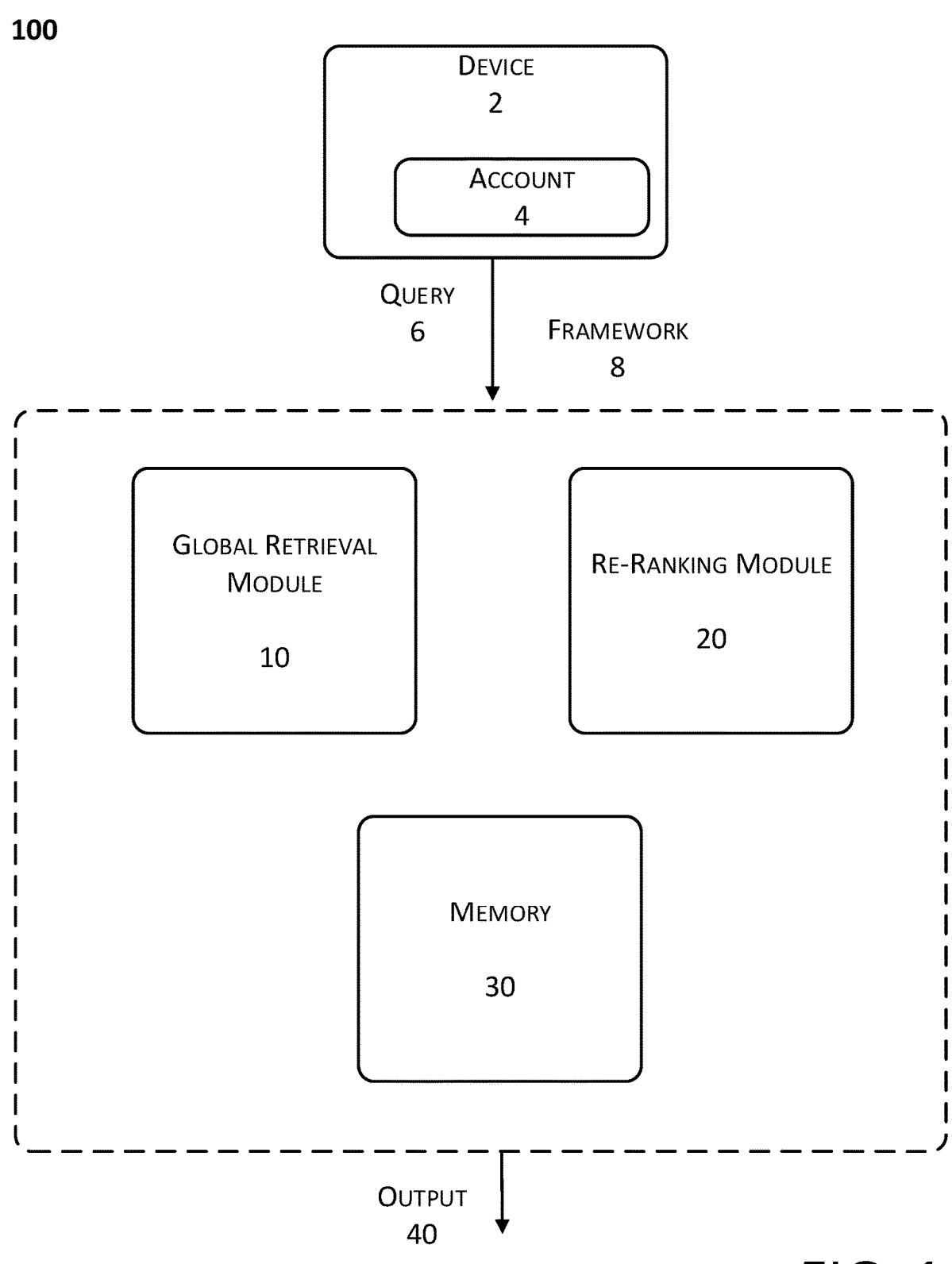
FIG. 1 shows a non-limiting example system in which a unified transformer-based visual place recognition (VPR) training framework may be implemented, arranged in accordance with at least some embodiments described and recited herein.

In the following detailed description, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described and recited herein, as well as illustrated in the drawings, may be arranged, substituted, combined, separated, and designed in a wide variety of different configurations, all of which are explicitly contemplated herein.

Additionally, portions of the present disclosure may be described herein in terms of functional block components and various processing steps. It should be appreciated that such functional blocks may be realized by any number of hardware, software, and/or firmware components configured to perform the specified functions.

Visual Place Recognition (VPR) estimates the location of query images by matching the respective query images with reference images that are stored in a reference database.

Described and recited herein are non-limiting examples and implementations of a unified VPR framework that handles both the retrieval of candidate reference images and the re-ranking, via a re-ranking module, of the candidate reference images with a novel transformer model. The re-ranking module takes into account feature correlation, attention value, and x-y coordinates to learn to determine whether an image pair (e.g., a query image and a reference image) is from the same location. Current re-ranking process requires a relatively large inference time and memory footprint (typically over 1 s and 1 MB per image), which cannot scale to real world applications with large QPS (queries per second) and reference database (>1M images). However, in accordance with the non-limiting examples and implementations described and recited herein, geometric information and task-relevant information may be learned with a data-driven module to further boost performance, while outperforming state-of-the-art methods on major VPR datasets with reduced inference time and memory consumption.

The VPR training framework described and recited herein is end-to-end trainable; however, in accordance with the non-limiting example embodiments described and recited herein, the global retrieval module and the re-ranking module are trained separately to promote stable convergence and a high-level of accuracy. Further, the re-ranking module, as described and recited herein, may be adopted on other transformer backbones as a generic component.

In the present description and recitation, the following terms may provide context for embodiments described, recited, and/or suggested herein; and may also be used, in addition to their accepted meaning, as follows.

Machine learning refers to learned or trained computer or processor-related technologies by which decisions and/or actions are autonomously made, in place of human intervention. Machine learning may be implemented by software, i.e., algorithms and/or programs; hardware; or firmware; or any combination thereof that supports computer vision, image understanding, image processing, natural language understanding, natural language processing, speech recognition, etc. Also included among the range of functions and capabilities implemented by and for machine learning, and pertinent to the embodiments disclosed, recited, and suggested herein, image detection and/or segmentation relative to an input image, images, or video.

Image segmentation, in accordance with computer vision and image processing, refers to technologies that are designed, programmed, or otherwise configured to partition a digital image into multiple image segments, e.g., patches, image regions or image objects, to simplify and/or change a representation of the original image into a format that is more easily managed and/or analyzed.

Queries, as disclosed and recited herein in accordance with known object detection and segmentation technologies, may respectively refer to a representation of an object including, but not limited to, an input image for which no location of the subject is provided. Each query may represent an object and have multiple representations referring to classification, box regression, and mask encoding simultaneously in vector form. For known object detection and segmentation technologies, basic queries are fixed for different objects in every input image.

A transformer, as disclosed, recited, and/or suggested herein, refers to a machine-learning model implemented by algorithms and/or programs, hardware or firmware, or any combination thereof, to, e.g., categorize, detect, isolate, and/or extract objects and/or segments of interest in an input image, images, and/or video, i.e., query. A transformer, in accordance with the non-limiting example embodiments described and recited herein may be hosted on one or multiple servers, on the order of hundreds to thousands, which may be hosted on a cloud-based infrastructure.

An encoder refers to a component or module that is designed, programmed, or otherwise configured to receive input, i.e., query, from an input device. As described and recited herein, an encoder may be regarded as a transformer-based encoder-decoder architecture, e.g., a DEtection TRansformer or DETR, that includes encoding layers that processes input iteratively. More particularly, an encoder, as disclosed, recited, and/or suggested herein, refers to one or more programmable components or modules that are designed, programmed, or otherwise configured to receive input data, i.e., query image. An encoder may be designed, programmed, or otherwise trained to iteratively extract, from the input data, using encoded latent codes, feature vectors corresponding to latent features in accordance with encoding technologies, i.e., extracted or mapped into the latent space. Non-limiting examples of extracted features may include buildings, automobiles, trees, street signs, surfaces, other objects, people, animals, etc.

Linear projection, as disclosed, recited, and/or suggested herein, refers to a component or module that is designed, programmed, or otherwise configured to map, using a linear a first representation to a second representation, e.g., to map an image patch to a multi-dimensional vector.

An attention map refers to a scalar matrix to display the relative importance of layer activations in two-dimensional (2D) spatial locations. That is, an attention map is a grid of numbers to indicate which 2D locations are of interest, i.e., important, for a given task.

An engine or generator, as disclosed, recited, and/or suggested herein, refers to a type of software, firmware, hardware, or any combination thereof, that facilitates generation of source code or markup to produce elements that begin another process. In addition, or alternatively, an engine or generator may facilitate automated processes, in which various software elements interact to produce an intended product, whether physical or virtual based on natural language descriptions, inputs, or other prompts. In accordance with known AI technologies, the AI engines or generators disclosed, recited, and/or suggested herein are trained in accordance with either unimodal or multimodal training models.

A social media application, as disclosed and recited herein, refers to an on-line application that allows account-holding users to interact with one another using various media and on varying scales, with such interaction including creating and/or sharing media content. As disclosed and recited herein, a user device may have an instance of social media application account stored locally or may access the user's account via a web-based version of the particular social media application.

A platform, e.g., a social media platform, as disclosed and recited herein, refers to an application on which algorithms and/or programs enabling execution or implementation of a collection of communication-based or media-sharing technologies may be hosted. Further, any algorithm or program described, recited, or suggested herein may be executed by one or more processors hosted on such a platform. Non-limiting examples of such technologies may include the creation, sharing, and/or storage of multi-media offerings.

Media, or multi-media, offerings or experiences, as referenced herein, may include but not be limited to recorded or live transmittable content including text, audio, images, animations, video, etc. In addition, such offerings or experiences may include, but again not be limited to, interactive augmented reality (AR) and/or interactive virtual reality (VR) experiences.

FIG. 1 shows a non-limiting example system in which a unified transformer-based visual place recognition (VPR) training framework may be implemented, arranged in accordance with at least some embodiments described and recited herein. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

In accordance with the non-limiting example embodiments, described and recited herein is the integration of global retrieval and re-ranking into a unified transformer-based framework that is simple, efficient, and effective. Global retrieval is implemented based on a class token without additional aggregation modules, and other image tokens are adopted as local features. Different from geometric verification, which focuses on geometric information between local feature pairs, the non-limiting example embodiments described and recited herein input correlation, coordinates, and attention information between all local feature pairs to transformer modules, so that the global retrieval module learns task-relevant information that is utilized for re-ranking.

Executable components or modules for global retrieval and re-ranking are either trained in an end-to-end manner or tuned alternatively with a more stable convergence.

A re-ranking module as described and recited herein may further be adopted on other neural network or transformer backbones. Further, the embodiments and methodologies described and recited herein outperform retrieval-only as well as retrieval and re-ranking state of-the-art methods on a wide range of VPR datasets. Further still, all features and intermediate data are directly generated using transformer.

The embodiments and methodologies described and recited herein implement an efficient design and apply linear layers for dimension reduction, i.e., 256 and 500×131 for global and local feature dimensions and 32 for transformer dimension of the re-ranking module; therefore, the embodiments and methodologies are significantly faster (>4.7× QPS) with much less, e.g., (<22%) memory consumption than known methods. As described and recited herein, global and local features are extracted from a common storage just once, and a re-ranking of top candidates is finished with one forward pass by determining re-ranking scores of all candidate pairs in parallel within one batch. Re-ranking speed is further boosted by parallel computing on multiple GPUs with >20× speedup over known methodologies.

As depicted, system 100 includes input device 2 and unified transformer-based visual place recognition (VPR) training framework 8, which may be hosted on, e.g., a media platform. Framework 8 includes, at least, global retrieval component or module 10 and re-ranking component or module 20. In accordance with at least some non-limiting example embodiments, framework 8 also includes memory 30.

VPR framework 8 may be hosted on or remotely and communicatively corresponds to a media platform, including but not limited to a social media platform. In addition, or alternatively, VPR framework 8 may be implemented in accordance with an on-line application that allows account-holding users to interact with one another using various media and on varying scales, with such interaction including creating and/or sharing media content. As disclosed and recited herein, device 2 may have an instance of social media application account stored locally or may access a user's account via a web-based version of the particular social media application. A platform, e.g., a social media platform and/or a security/surveillance platform, as disclosed and recited herein, refers to an application on which algorithms and/or programs enabling execution or implementation of a collection of communication-based or media-sharing technologies may be hosted. Such technologies include monitoring, creating, sharing, and/or storing multimedia offerings.

Any one or more of a server or cluster of servers upon which a media platform is hosted, and VPR framework 8 is executed or implemented, refers to a high-performance computing (HPC) environment that includes, at least, a CPU and GPU that is present on a, e.g., a video card, embedded on a motherboard, or on the CPU die. The training and/or resulting object detection may be executed entirely on the CPU or in part on the CPU and the GPU. Alternative embodiments may be executed in evolved HPC modules known in the art. Regardless, the CPU, GPU, and/or HPC modules may store one or more algorithms and/or programs that, when executed thereon, may cause the execution or performance of operations and/or functionality as disclosed and/or recited herein. Also, a computer-readable non-volatile medium may be provided according to the embodiments described herein. The computer readable medium stores computer programs. The computer programs are used to, when being executed by a processor, execute or perform the operations or functionality in connection with at least the embodiments described and recited herein.

Device 2 may host or otherwise be communicatively connected to an instance of a social media application account 4, as referenced above. Also, device 2 refers to one or more embodiments of a classical computing environment that may be or include a classical computer, processing device, a microprocessor, a microcontroller, a digital signal processor, or any combination thereof. Device 2 could also be one of various electronic devices, or a combination thereof, having one or more image and/or video capturing components, i.e., camera and/or video recorder, display screens with audio and/or video inputs/outputs and that support the providing of and consumption of content relative to a media platform. The various electronic devices may include but not be limited to a smartphone, a tablet computer, a laptop computer, a desktop computer, an e-book reader, an MP3 (moving picture experts group audio layer III) player, an MP4, and/or any other suitable electronic devices. Additional non-limiting examples of input device 2 may include a database, local server, cloud-based service, a virtual reality (VR) and/or augmented reality (AR) servers, etc. Further, any algorithm or program described, recited, or suggested herein may be executed by one or more processors hosted on input device 2.

Input 6, in accordance with at least some of the embodiments disclosed and recited herein, refers to one or more digital images and/or digital video, or frames therefrom, that may be input manually or in an automated manner to an appropriate input interface. Input 6 may be transmitted from device 2 or account 4 or otherwise communicated from device 2 to a receiving module corresponding to VPR framework 8 via a wired or wireless network. Such network may be regarded as a medium that is provided as a bidirectional communications link between a media platform, on which VPR framework 8 is hosted, and input device 2. The network may include the Internet, a local area network (LAN), a wide area network (WAN), a local interconnect network (LIN), a localized cloud, etc.

VPR framework 8 refers to machine learning-based implementation of, e.g., algorithms and/or programs, hardware or firmware, or any combination thereof, that provides a unified retrieval and re-ranking framework for VPR with pure transformers. More particularly, by VPR framework 8, re-ranking module 20 learns global attention on the correlation of possible pairings between query 6 and reference images. As described and recited herein, VPR framework 8 may be regarded as implementing a transformer-based encoder-decoder architecture that processes input iteratively.

Global retrieval module 10, at a high level, implements a vision transformer (ViT) for VPR. Accordingly, an input image $I \in R^{h \times w \times c}$ is first divided into small p×p patches, e.g., p=16, and is converted into a number of tokens $T \in R^{n \times d}$ by linear projection, as the input of transformer encoders. Here n, d denote the number and dimension of tokens, respectively e.g., n=500, d=131; and h, w, c denote height, width, and channel numbers of input images. In addition to the n patch tokens, ViT adds an additional learnable class token to aggregate classification information from each layer, serving as an alternative for feature aggregation. The learnable position embedding $PE \in R^{(n+1) \times d}$ from ViT is added to each token to provide positional information. 2D interpolation is then conducted on the positional embedding so that the input resolution, e.g., (640×480), is arbitrary (640×480).

Global retrieval module 10 utilizes encoders, described further below, implementing L cascaded basic transformer layers. Such a transformer encoder includes a multi-head attention module, which adopts three linear projections to convert an input token into query, key, and value, i.e., Q, K, V with dimension d. The basic attention is computed as $\mathrm{softmax}(QK^T/d)V$ (T=transpose), and a multi-head attention module performs this attention procedure in parallel for multiple heads with their final outputs concatenated. The multi-head attention module models global correlation to facilitate information aggregation for global representation. The output class token from the last transformer layer may be input to a linear layer to generate a global feature with, e.g., 256 dimensions. The local features are generated by applying a linear head on the output patch tokens of the penultimate transformer layer and the dimension is reduced, for example, from 256 to 128 to achieve a small memory consumption. Both global and local features are L2 normalized after reduction.

The non-limiting example implementation described above is further described below in accordance with the non-limiting example embodiment of FIG. 2.

Re-ranking module 20, at a high level, implements attention-based selection and correlation-based re-ranking.

Regarding attention-based selection, because local features occupy the majority of memory, for the purposes of re-ranking it is advantageous to reduce a number of local features from both a query image as well as reference images. Thus, in accordance with the non-limiting example embodiments described and recited herein, leveraging a natural attention map, a tenable fixed number of local features, e.g., 500, having top attention values is saved, resulting in a lower memory cost and simpler extraction pipeline, relative to known implementations.

In the context of a transformer having L−1 layers, an (n+1)×(n+1) attention matrix of the last transformer may be formulated as $\mathrm{softmax}(QK^T/d)$, representing a contribution from each input token to each output token, where n denotes the number of patches. Because an output class (CLS) token connects to a global embedding feature, the CLS token output channel of the matrix ((n+1)-dimensional vector for n patches and CLS token) represents the contribution from input tokens to the global feature, corresponding to the importance of each patch. The n-dimensional vector corresponding to n patches may be re-shaped as an h×w attention map to sort the tokens, and the top, i.e., that are likely to cover the informative regions, tokens, e.g., 500. The attention value and x, y coordinates are saved along with each local feature, resulting in, e.g., 128+3=131 dimensions, for which 128 is the dimensions of local features which can be any suitable numbers other than 128.

In accordance with the non-limiting example embodiments of re-ranking module 20 described and recited herein, correlation-based re-ranking leverages top matched pairs for local features, as well as other information that could be useful for re-ranking, i.e., correlation and attention value. That is, local feature pairs having higher correlation/similarity have high probabilities to be correct local matches, and an image pair with more correct local matches is more likely to represent the same place. Also, high attention values of local patches likely indicates an importance of local feature pairs. Therefore, re-ranking module 20 is configured, designed, or otherwise programmed to maintain correlation, attention, and positional information for all local feature pairs in a correlation matrix, resulting in, e.g., seven (7) dimensions, i.e., (x, y, A, x', y', A', S), for which x, y, x', y' represent coordinates of two patches in the original images; A, A' denotes the attention values of the two patches; S is the cosine similarity between the, e.g., 128-dimensional local features, and because each image has 500 selected features/tokens, there are 500×500 pairs, resulting in a 500×500×7 correlation matrix. The correlation matrix includes information for all feature pairs that facilitates learning by re-ranking module 20 of features that are useful to determine whether two images are from a same location. To reduce computation cost, five (5) nearest neighbors of each token in the feature space are selected to produce two 500×5×7 matrices. The matrices are concatenated together and fed to a linear layer, resulting in a 1000×5×32 matrix, for which 1000 is the number of tokens and 32 is the dimensions of each token. The strong global correlation modeling of transformer to aggregate the large matrix is then leveraged as a re-ranking score to determine whether the input pair is a correct match. A first transformer block is utilized to extract important information from the top-5 pairs as one token, and a second transformer block is utilized to extract and aggregate the information from the 1000 tokens as a single 32-dimension vector. The transformer blocks are multiple transformer layers with linear projection and standard sinusoidal positional embedding. The vector is then converted into two (2) channels by a linear head as a binary classification, i.e., true or false.

To ensure that re-ranking module 20 sees top-k hardest samples during training, re-ranking module 20 is trained with randomly selected negative samples from the top-k, best-matching samples of reference images 210 of the full database. The retrieval and re-ranking modules are then fine-tuned together with partial negative mining for better performance.

The non-limiting example implementation of re-ranking module 20 described above is further described below in accordance with the non-limiting example embodiment of FIG. 3.

Figure 2:
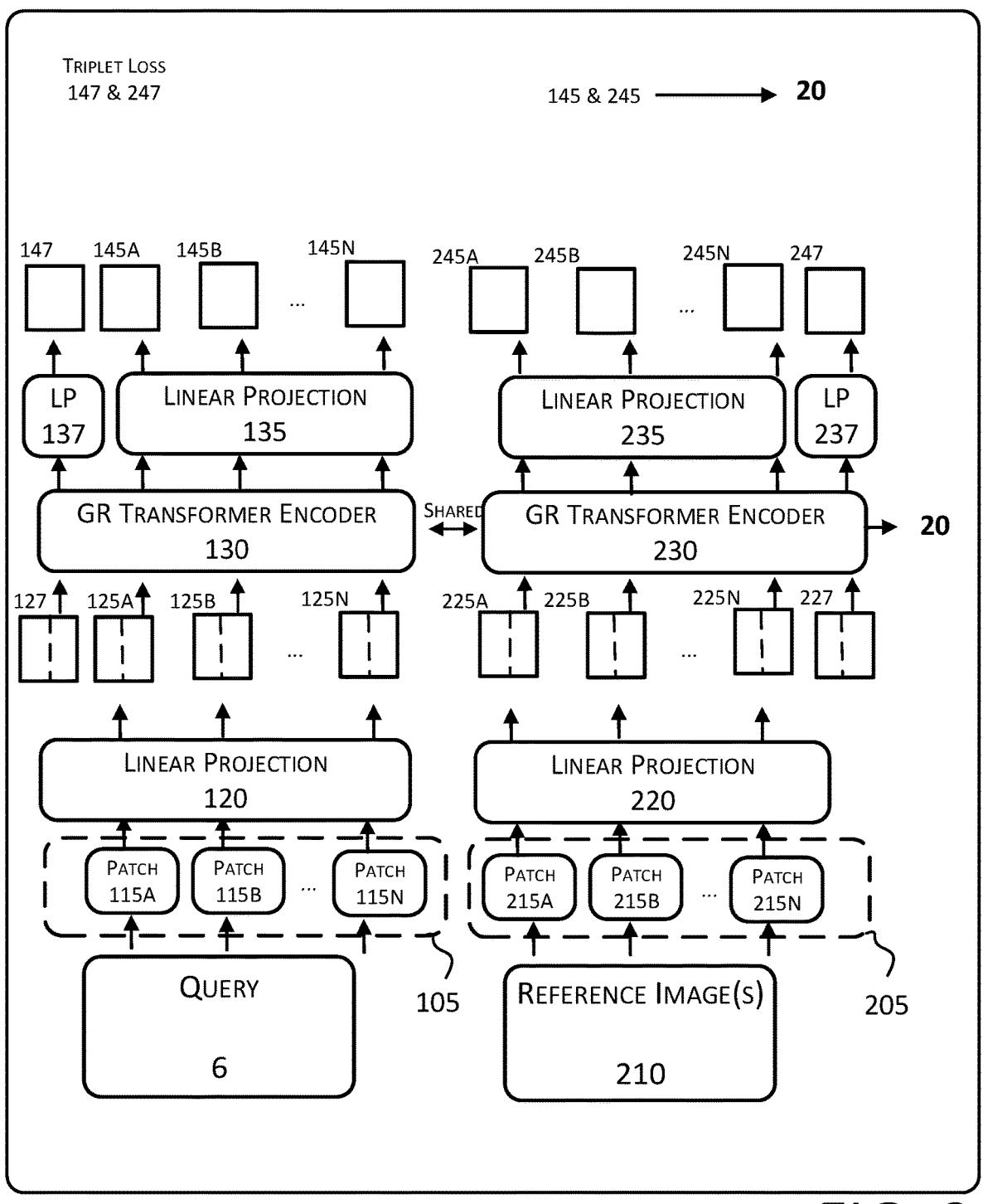
FIG. 2 shows a non-limiting example of a global retrieval module corresponding to a unified transformer-based VPR training framework, in accordance with at least some embodiments described and recited herein.

FIG. 2 shows a non-limiting example of global retrieval module 10 corresponding to unified transformer-based visual place recognition (VPR) training framework 8, in accordance with at least some embodiments described and recited herein. As depicted, global retrieval module 10 includes, at least, image segmenters 105 and 205; linear projection components or modules 120 and 220; global retrieval transformer encoders 130 and 230; and linear projection components or modules 235. Although illustrated as discrete components or modules, various components or modules may be divided into additional components or modules, combined into fewer components or modules, or eliminated altogether while being contemplated within the scope of the disclosed subject matter. It will be understood by those skilled in the art that each function and/or operation of the components or modules may be implemented, individually and/or collectively, by a wide range of hardware, software, firmware, or any combination thereof.

In accordance with the features, components, and modules illustrated in FIG. 2 and described below, N is an integer that is not bound or limited by the example embodiments described and recited herein.

Image segmenters 105 and 205, respectively, refer to a transformer component or module that is designed, programmed, or otherwise configured to partition input query 6 into multiple image segments, e.g., patches, image regions or image objects, to simplify and/or change a representation of the original image into a format that is more easily managed and/or analyzed.

In accordance with the non-limiting example embodiments described and recited herein, image segmenter 105 receives query input 6 from device 2 and divides query 6 into patches 115A, 115B, . . . , 115N. Further, image segmenter 205 receives or retrieves reference images 210 from memory 30 and divide each of the received or retrieved reference images 210 into patches 215A, 215B, . . . , 215N.

In some embodiments, query 6 and reference images 210 are all divided into 256 patches, i.e., query 6 and each of reference images 210 is divided into 16×16 patches.

Further, unless context otherwise requires reference to a particular patch or portion of patches, reference may be made to patch 115, patches 115, patch 215, or patches 215, without being limited in any manner. Further still, though image segmenter 105 and image segmenter 205 are illustrated as being separate components or modules corresponding to global retrieval module 10, other non-limiting example embodiments of framework 8 may include a singular image segmenter to divide query image 6 and reference images 120 into patches 115 and 215.

Linear projection module 120 and linear projection module 220, respectively, refer to a transformer component or module that flattens image patches or a plurality thereof into vectors. The dimensions of the resultant vectors are based on a constant latent vector size.

In accordance with the non-limiting example embodiments described and recited herein, linear projection module 120 executes a linear projection of patches 115 to produce patch tokens 125A, 125B, . . . , 125N, which include the addition of respective position embedding PE to provide positional information of the respective patch in query image 6. Further, linear projection module 220 executes a linear projection of patches 215 to produce patch tokens 225A, 225B, . . . , 225N, which include the addition of respective position embedding PE to provide positional information of the respective patch in the corresponding reference image.

Further, unless context otherwise requires reference to a particular patch or portion of patches, reference may be made to patch token 125, patch tokens 125, patch token 225, or patch tokens 225, without being limited in any manner. Further still, though linear projection module 120 and linear projection module 220 are illustrated as being separate components or modules corresponding to global retrieval module 10, other non-limiting example embodiments of framework 8 may include a singular linear projection module to flatten patches 115 and 215 into respective vector representations.

GR transformer encoder 130 refers to a transformer component or module that is designed, programmed, or otherwise configured to encode a randomly initialized class token 127 and patch tokens 125 to produce vector representations thereof. Encoded class token 127 extracts and/or aggregates information from all of patch tokens 125. Further, GR transformer encoder 230 refers to a transformer component or module that is designed, programmed, or otherwise configured to encode a randomly initialized class token 227 and patch tokens 225 to produce vector representations thereof. Encoded class token 227 extracts and/or aggregates information from all of patch tokens 225.

Unless context otherwise requires reference to a particular patch or portion of patches, reference may be made to a patch token 125, patch tokens 115, a patch 225, or patch tokens 215, without being limited in any manner. Further still, though GR transformer encoder 130 and GR transformer encoder 230 are illustrated as being separate components or modules corresponding to global retrieval module 10, other non-limiting example embodiments of unified VPR training framework 8 may include a singular GR transformer encoder to produce vector representations of input patch tokens.

Linear projection module 135 is designed, programmed, or otherwise configured to flatten the vector representations of encoded patch tokens 125 into linear vectors 145A, 145B, . . . 145N, representing local features of query 6. Further, linear projection module 137 is designed, programmed, or otherwise configured to flatten the vector representation of encoded class token 127 into linear vector 147, representing global features of query 6.

Linear projection module 235 is designed, programmed, or otherwise configured to flatten the vector representations of encoded class tokens 225 into linear vectors 245A, 245B, . . . 245N, representing local features of respective ones of reference images 210. Further, linear projection module 237 is designed, programmed, or otherwise configured to flatten the vector representation of encoded class token 227 into linear vector 247, representing global features of respective ones of reference images 210.

Unless context otherwise requires reference to a particular patch or portion of patches, reference may be made to a linear vector 145, linear vectors 145, a linear vector 245, or linear vectors 245, without being limited in any manner. Further still, though linear projection module 135 and linear projection module 235 are illustrated as being separate components or modules corresponding to global retrieval module 10, other non-limiting example embodiments of framework 8 may include a singular linear projection module to produce vector representations of the GR transformer encoder output.

Linear vector 147 and linear vector 247 represent triplet loss that is used to train global retrieval module 10. That is, the global features of query 6 provided in linear vector 147 are compared to the global features of a respective one of reference images 210 provided in linear vector 247 to determine positives, i.e., matching input, and negatives, i.e., non-matching input.

Thus, based on the non-limiting example embodiment of global retrieval module 10 shown in FIG. 2, it is shown that, given a set of query images $\{I_q\}$ and reference images $\{I_r\}$, global retrieval module 10 is to learn an embedding space in which each query $I_q$ is close to its corresponding positive reference image $I_r$. During training, reference images 210 from the same location as query image 6 are positive samples, and the typical threshold is set at ten (10) meters. Other reference images with distances greater than 25 meters are negative samples. Partial negative mining is conducted to select top negative samples from a random subset. The global embedding features of query, positive samples, and negative samples are denoted as $E_q$, Ep, $E_n$ and the global retrieval loss is trained with margin triplet loss:

$$L_{retrieval}=\max(\|E_q-E_p\|2-\|E_q-E_n\|2+m,0);$$

$\|\cdot\|2$ denotes squared L2norm and m is the margin.

Re-ranking module 20, as described below with reference to FIG. 3, receives linear vector 145 and linear vector 245, representative of local features of query 7 and respective reference images 210 as input and generates two-logit scores L as the output of a binary classification, representing the likelihoods for True or False matches. Both positive and negative query-reference pairs are fed to re-ranking module 8 during training and the cross entropy loss is formulated as:

$$L_{re\text{-}ranking}=CE(\text{Softmax}(L_{qr}),J_{qr})$$

L and/denote logits scores and ground-truth labels for the query-reference pairs. Overall, re-ranking module 20 is to distinguish top-k retrieved candidates that are more definitive than partial negative samples.

Figure 3:
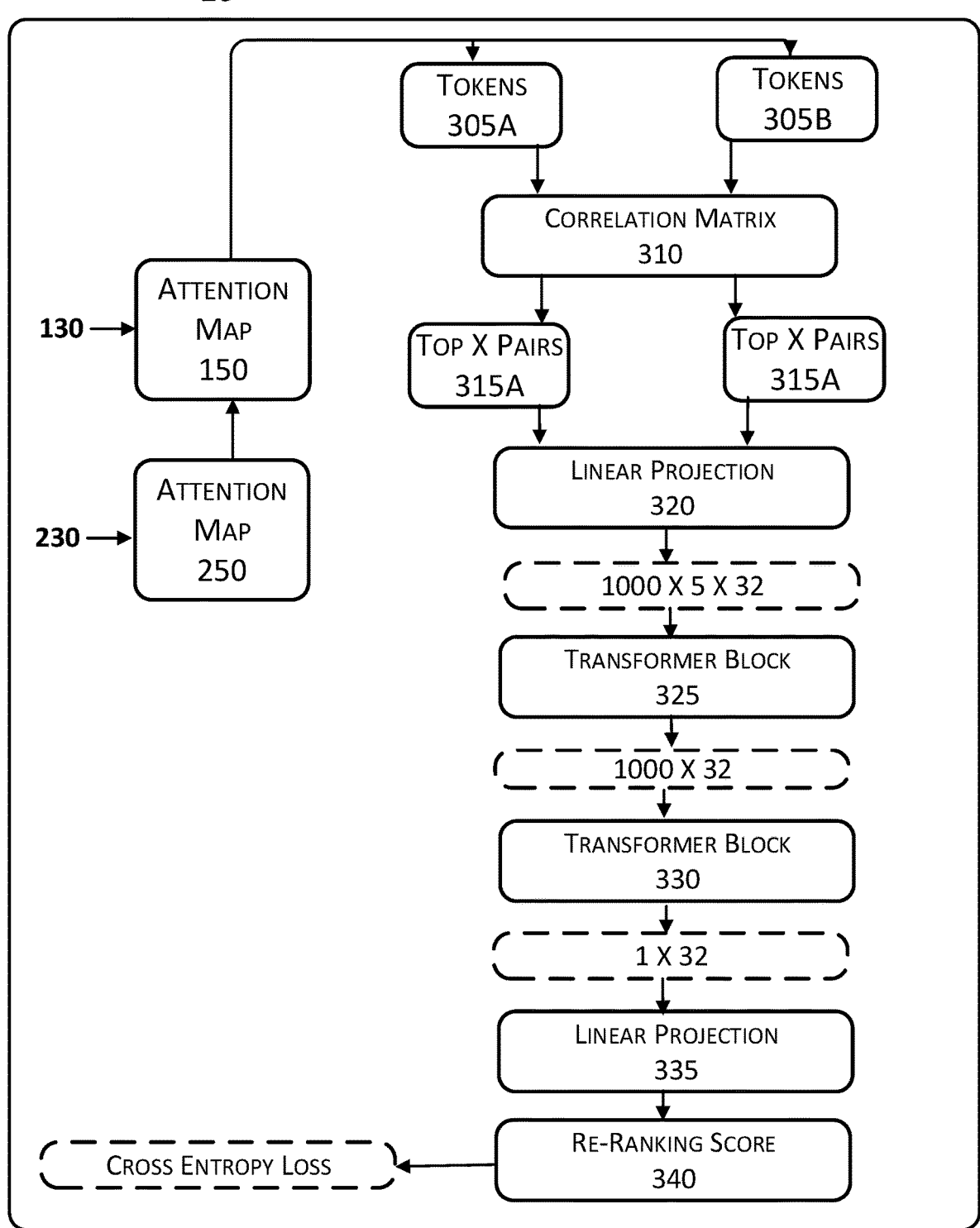
FIG. 3 shows a non-limiting example of a re-ranking transformer module corresponding to a unified transformer-based VPR training framework, in accordance with at least some embodiments described and recited herein.

FIG. 3 shows a non-limiting example of re-ranking transformer module 20 corresponding to unified transformer-based visual place recognition (VPR) training framework 8, in accordance with at least some embodiments described and recited herein.

As depicted, re-ranking module 20 includes, at least, attention map generators 150 and 250; token generators 305A and 305B; correlation matrix generator 310; pair identifiers 315A and 315B; linear projection module 320; transformer block 325; transformer block 330; linear projection module 335; and re-ranking score generator 340. Although illustrated as discrete components or modules, various components or modules may be divided into additional components or modules; combined into fewer components or modules, e.g., attention map generators 150 and 250, token generators 305A and 305B, and pair identifiers 315A and 315B; or eliminated altogether while being contemplated within the scope of the disclosed subject matter. It will be understood by those skilled in the art that each function and/or operation of the components or modules may be implemented, individually and/or collectively, by a wide range of hardware, software, firmware, or any combination thereof.

Attention map generators 150 and 250, respectively, refer to a transformer component or module that is designed, programmed, or otherwise configured to generate an attention map for query 6 and a respective one of reference images 210, respectively based on the vector representations of patch tokens 125 produced by GR transformer encoder 130 and the vector representations of patch tokens 225 produced by GR transformer encoder 230 (see FIG. 2). Although attention map generator 150 and attention map generator 250 are illustrated as being separate components or modules according to re-ranking module 20, other non-limiting example embodiments of unified VPR training framework 8 may include a singular attention map generator.

As is known, the generated attention maps are, respectively, a scalar matrix that display the relative importance of features in the respective images. That is, an attention map is a numerical grid that indicates which 2D images are important for VPR.

Further, the generated attention maps are leveraged within re-ranking module 20 so that a fixed number of local features, e.g., 500, from query image 6 and a respective one of reference images 210, to ensure a low memory cost and robust extraction process. Therefore, effectively, local features pertaining to various patches in both query image 6 and a respective one of reference images 210 may be disregarded, with the local features having the highest attention values (per image) on the order of the fixed number, e.g., 500, of patches being retained for re-ranking purposes.

As described with regard to FIG. 1, global retrieval module 10 utilizes transformer encoders, implementing L cascaded basic transformer layers, that includes multi-head attention map generator 250, which adopts three linear projections to convert an input token into query, key, and value, i.e., Q, K, V with dimension d. Basic attention is computed as $\text{softmax}(QK^T/d)V$ (T=transpose), and a multi-head attention module computes attention in parallel for multiple heads with the final outputs thereof being concatenated. The multi-head attention module models global correlation to facilitate information aggregation for global representation. Class tokens output from the last transformer layer are input to a linear layer to generate a global feature with, e.g., 256 dimensions. The local features are generated by applying a linear head on the output patch tokens of the penultimate transformer layer and the dimension is reduced to 128 to achieve a small memory consumption. Both global and local features are L2 normalized after reduction.

Token generators 305A and 305B, respectively, refer to a transformer component or module that is designed, programmed, or otherwise configured to receive the fixed number, e.g., 500, highest attention tokens pertaining to query image 6 and a respective one of reference images 210, with the X, y coordinates thereof being saved along therewith, resulting in respective matrices of, e.g., 500×131 dimensions.

Correlation matrix generator 310 refers to a transformer component or module that is designed, programmed, or otherwise configured to generate a correlation matrix by transposing the matrices generated by token generator 305A and token generator 305B. Using the non-limiting example described above, by which the respective matrices are of 500×131 dimensions, the result of the transposing is a correlation matrix of dimensions 500×500×7, for which the 500 highest-attention patches are included, each with the respectively corresponding attention values, x, y, and a similarity value, resulting in the seven (7) dimensions.

As described with regard to FIG. 1, correlation-based re-ranking leverages top matched pairs for local features, as well as other information that could be useful for re-ranking, i.e., correlation and attention value. That is, local feature pairs having higher correlation and/or similarity are highly probable correct local matches, and an image pair with more correct local matches is likely to correspond to a same location. Also, high attention values of local patches are indicative of an importance of local feature pairs. Therefore, re-ranking module 20 is configured, designed, or otherwise programmed to maintain correlation, attention, and positional information for all local feature pairs in a correlation matrix, resulting in, e.g., seven (7) dimensions, i.e., (x, y, A, x', y', A', S). x, y, x', y' represent coordinates of two patches in the original images; A, A' represent attention values of the two patches; and S is the cosine similarity between the, e.g., 128-dimensional local features. Because each image has 500 selected features/tokens, there are 500×500 pairs, resulting in the aforementioned 500×500×7 correlation matrix. The correlation matrix includes information for all feature pairs to facilitate learning by re-ranking module 20 of pertinent features for determining whether two images are from a same location.

Pair identifiers 315A and 315B, respectively, refer to a transformer component or module that is designed, programmed, or otherwise configured to identify or select from the, e.g., 500×500×7 correlation matrix, relative to query image 6 and a respective one of reference images 210, e.g., five (5) most proximate tokens for each token in the feature space to respectively generate a 500×5×7 matrix.

Linear projection module 320 is designed, programmed, or otherwise configured to concatenate the matrices generated by pair identifiers 315A and 315B or receive a concatenation of the matrices, and flatten the concatenated matrices into a, e.g., 1000×5×32 matrix.

Transformer block 325 refers to a component or module that is designed, programmed, or otherwise configured to encode or extract information from the top, e.g., five (5) pairs having the highest attention values, resulting in tokens on the order of, e.g., 1000×32.

Transformer block 330 refers to a component or module that is designed, programmed, or otherwise configured to receive the, e.g., 1000×32 tokens and extract and aggregate information to provide or generate a single 32-dimension vector.

Linear projection module 335 is designed, programmed, or otherwise configured to extract and aggregate the information from the 1000 tokens as a single 32-dimension vector.

Re-ranking score module 340 is a component or module that is designed, programmed, or otherwise configured to implement sinusoidal positional embedding to convert the vector into two (2) channels by a linear head as a binary classification, i.e., true or false.

Figure 4A:
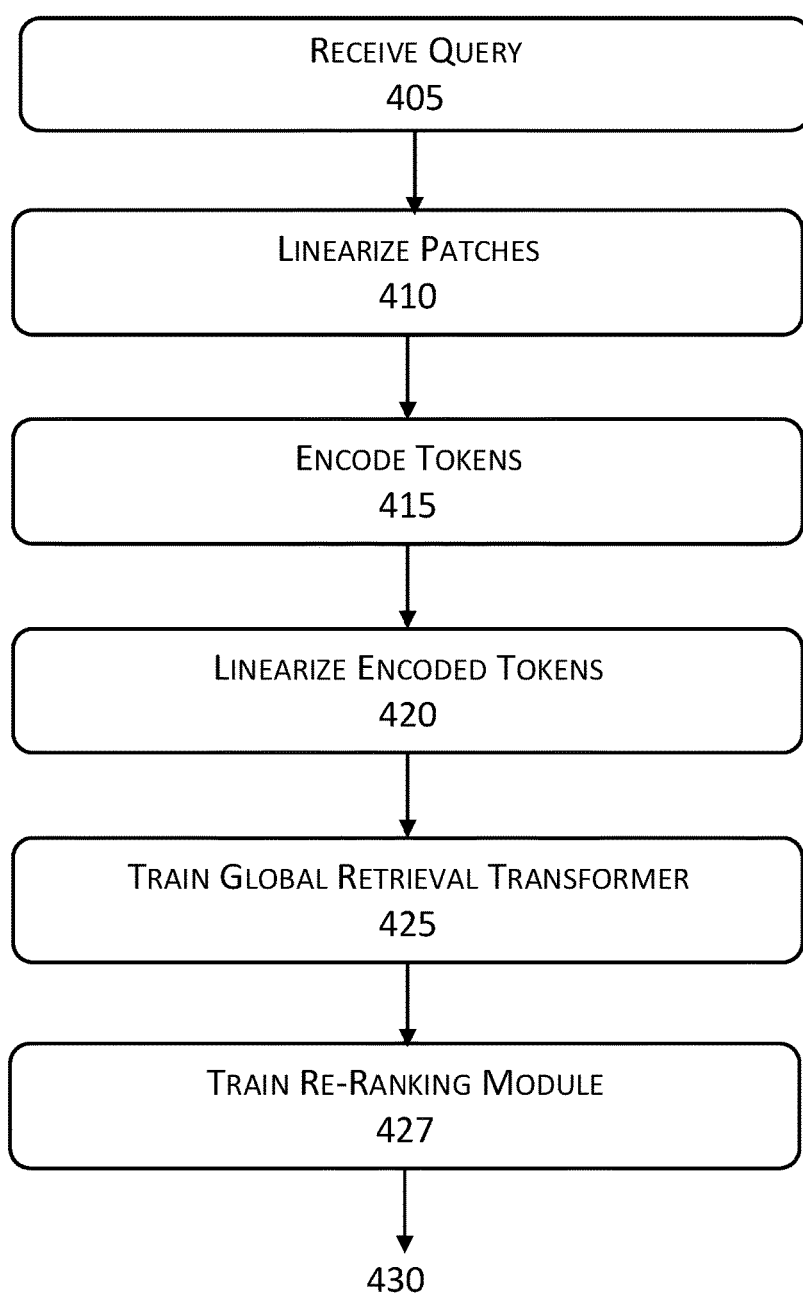
FIG. 4A and FIG. 4B together show a non-limiting example of a processing flow for training a unified transformer-based VPR training framework, in accordance with at least some embodiments described and recited herein.
Figure 4B:
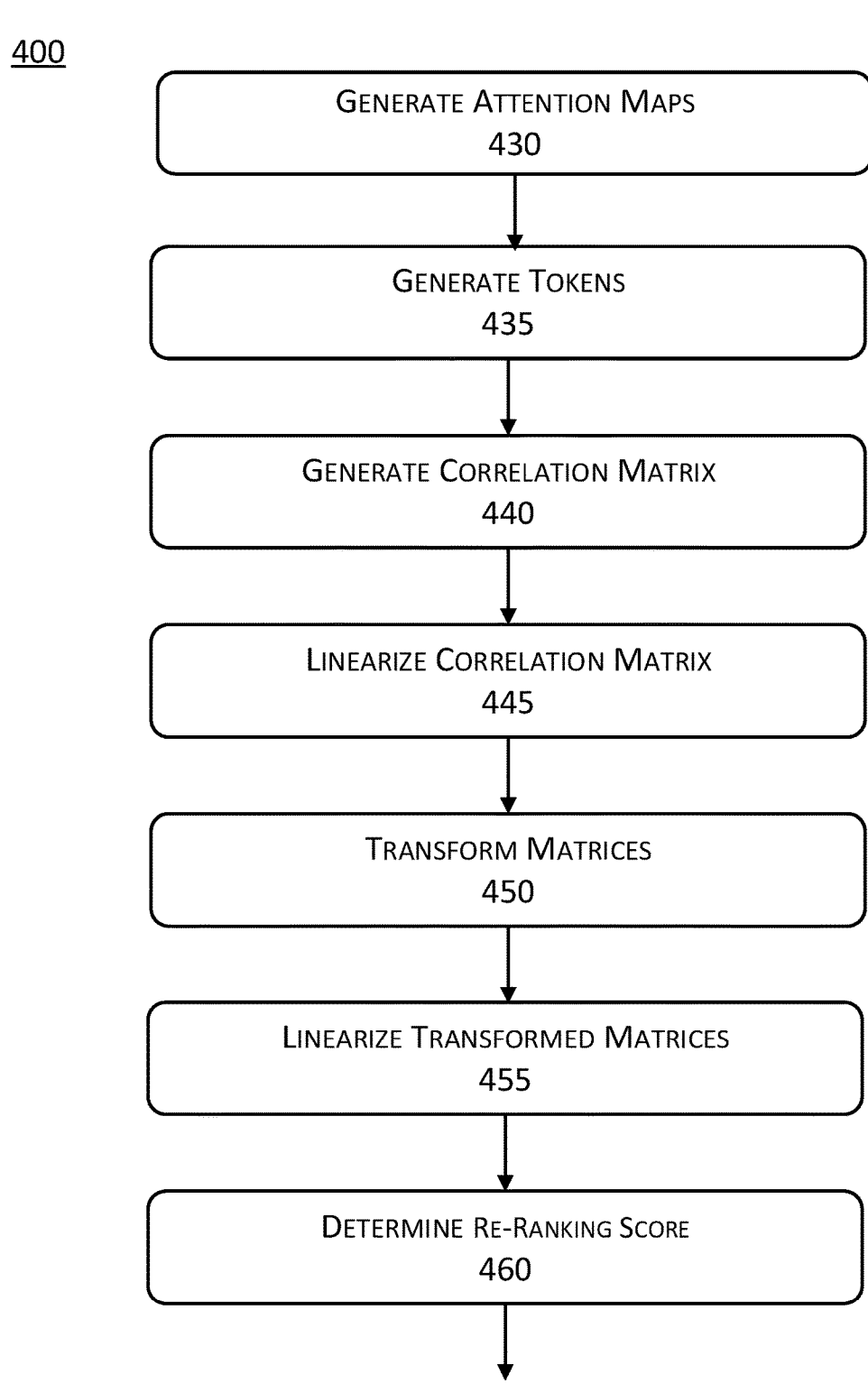

FIG. 4A and FIG. 4B together shows a non-limiting example of a processing flow for training a unified transformer-based visual place recognition (VPR) training framework, in accordance with at least some of the non-limiting example embodiments described and recited herein with regard to FIGS. 1-3. It is understood that each function and/or operation shown and described with reference to FIG. 4A and FIG. 4B may be implemented, individually and/or collectively, by a wide range of hardware, software, firmware, or any combination thereof, such as those illustrated, described, and even suggested in accordance with FIGS. 1-3. Further, processing flow 400 may include one or more operations, actions, or functions as illustrated by one or more of blocks 405, 410, 415, 420, 425, 427 430, 435, 440, 445, and 450. These various operations, functions, or actions may, for example, correspond to software, program code, or program instructions executable by a processor that causes the functions to be performed. Although illustrated as discrete blocks, obvious modifications may be made, e.g., two or more of the blocks may be re-ordered; further blocks may be added; and various blocks may be divided into additional blocks, combined into fewer blocks, or eliminated, depending on the desired implementation. Processing flow 400 may begin at block 405, relative to global retrieval module 10.

Block 405 (receive query) refers to query 6 being received to framework 8, in particular global retrieval module 10, from device 2. Processing may continue to block 410.

Block 410 (linearize patches) refers to image segmenters 105 and 205, respectively, partitioning query 6 and respective ones of reference images 210 into patches 115 and patches 215; and linear projection modules 120 and 220, respectively, flattening the patches into patch tokens 125 and 225. Processing may continue to block 415.

Block 415 (encode tokens) refers to GR transformer encoder 130 encoding randomly initialized class token 127 and patch tokens 125, and GR transformer encoder 230 encoding randomly initialized class token 227 and patch tokens 225. Processing may continue to block 420.

Block 420 (linearize encoded tokens) refers to linear projection module 135 flattening the vector representations of encoded patch tokens 125 into linear vectors 145 to represent local features of query 6, and linear projection module 137 flattening the vector representation of encoded class token 127 into linear vector 147 to represent global features of query 6. Block 420 further refers to linear projection module 235 flattening the vector representations of encoded patch tokens 225 into linear vectors 245 to represent local features of respective ones of reference images 210, and linear projection module 237 flattening the vector representation of encoded class token 227 into linear vector 247 to represent global features of the respective ones of reference images 210. Processing may continue to block 425.

Block 425 (train global retrieval transformer) refers to linear vector 147 and linear vector 2547 being used to train re-ranking module 20. Processing may continue to block 427.

Block 427 (train re-ranking module) refers to linear features 145 and linear features 245 being used to train re-ranking module 20. Processing may continue to block 430.

Block 430 (generate attention maps) refers to attention map generators 150 and 250 generating an attention map for query 6 and a respective one of reference images 210, respectively based on the vector representations of patch tokens 125 produced by GR transformer encoder 130 and the vector representations of patch tokens 225 produced by GR transformer encoder 230. Processing may continue to block 435.

Block 435 (generate tokens) refers to token generators 305A and 305B producing matrices of, e.g., 500×131 dimensions based on the fixed number, e.g., 500, highest-attention value tokens pertaining to query image 6 and a respective one of reference images 210, with the X, y coordinates thereof being saved along therewith. Processing may proceed to block 440.

Block 440 (generate correlation matrix) refers to correlation matrix generator 310 generating a correlation matrix by transposing the matrices generated by token generator 305A and token generator 305B, the result being a correlation matrix of dimensions 500×500×7, for which the 500 highest-attention patches are included, each with the respectively corresponding attention values, x, y, and a similarity value, resulting in the seven (7) dimensions. Block 440 may further include pair identifiers 315A and 315B identifying or selecting, e.g., five (5) most proximate tokens for each token in the feature space in the generated correlation matrix. Processing may proceed to block 445.

Block 445 (linearize correlation matrix) refers to linear projection module 320 concatenating the matrices generated by pair identifiers 315A and 315B or receiving a concatenation of the matrices, and flattening the concatenated matrices into a, e.g., 1000×5×32 matrix. Processing may proceed to block 450.

Block 450 (transform matrices) refers to transformer blocks 325 and 330 encoding or extracting information from the top, e.g., five (5) pairs having the highest attention values, resulting in tokens on the order of, e.g., 1000×32; and then receiving the, e.g., 1000×32 tokens and extracting and aggregating information to provide or generate a single 32-dimension vector. Processing may proceed to block 455.

Block 455 (linearize transformed matrices) refers to linear projection module 335 extracting and aggregating the information from the 1000 tokens as a single 32-dimension vector. Processing may proceed to block 460.

Block 460 (determine re-ranking score) refers to re-ranking score module 340 implementing sinusoidal positional embedding to convert the vector into two (2) channels by a linear head as a binary classification, i.e., true or false.

Figure 5:
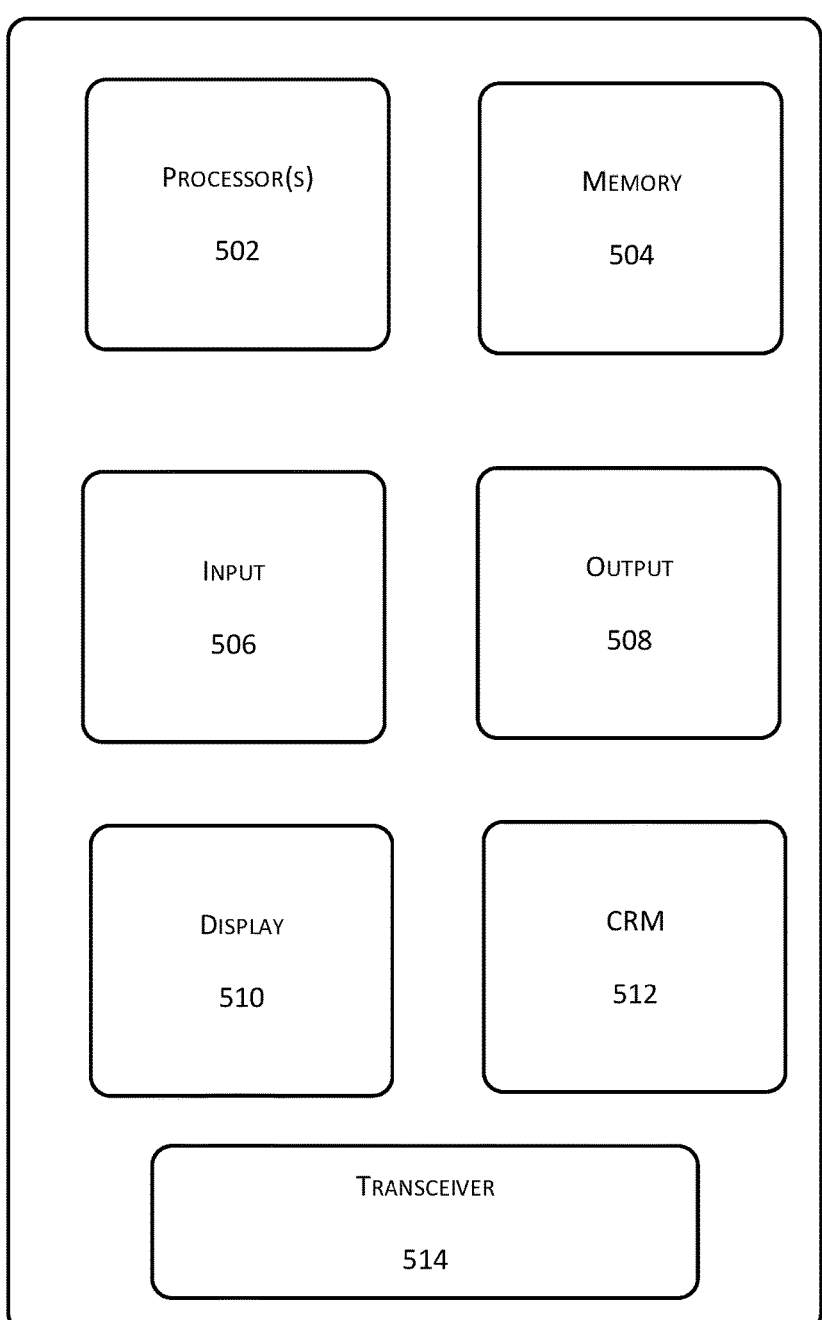
FIG. 5 shows an illustrative computing embodiment, in which any of the processes and sub-processes of training a unified transformer-based VPR training framework may be implemented as executable instructions stored on a non-volatile computer-readable medium.

FIG. 5 shows an illustrative computing embodiment, in which any of the processes and sub-processes of training a unified transformer-based visual place recognition (VPR) training framework may be implemented as executable instructions stored on a non-volatile computer-readable medium. The computer-readable instructions may, for example, be executed by a processor of a device, as referenced herein, having a network element and/or any other device corresponding thereto, particularly as applicable to the applications and/or programs described above corresponding to system 100.

In a very basic configuration, a computing device 500 may typically include, at least, one or more processors 502, a memory 504, one or more input components or modules 506, one or more output components or modules 508, a display component or module 510, a computer-readable medium 512, and a transceiver 514.

Processor 502 refers to, e.g., a microprocessor, a microcontroller, a digital signal processor, or any combination thereof.

Memory 504 refers to, e.g., a volatile memory, nonvolatile memory, or any combination thereof. Memory 504 stores therein an operating system, one or more applications corresponding to model 105 and/or program data therefore. That is, memory 504 stores executable instructions to implement any of the functions or operations described above and, therefore, memory 504 may be regarded as a computer-readable medium.

Input component or module 506 refers to a built-in or communicatively coupled keyboard, touch screen, or telecommunication device. Alternatively, input component or module 506 includes a microphone that is configured, in cooperation with a voice-recognition program that may be stored in memory 504, to receive voice commands from a user of computing device 500. Further, input component or module 506, if not built-in to computing device 500, may be communicatively coupled thereto via short-range communication protocols including, but not limitation, radio frequency or Bluetooth®.

Output component or module 508 refers to a component or module, built-in or removable from computing device 500 that is configured to output commands and data to an external device.

Display component or module 510 refers to, e.g., a solid state display that may have touch input capabilities. That is, display component or module 510 may include capabilities that may be shared with or replace those of input component or module 506.

Computer-readable medium 512 refers to a separable machine-readable medium that is configured to store one or more programs that embody any of the functions or operations described above. That is, computer-readable medium 512, which may be received into or otherwise connected to a drive component or module of computing device 500, may store executable instructions to implement any of the functions or operations described above. These instructions may be complimentary or otherwise independent of those stored by memory 504.

Transceiver 514 refers to a network communication link for computing device 500, configured as a wired network or direct-wired connection. Alternatively, transceiver 514 is configured as a wireless connection, e.g., radio frequency (RF), infrared, Bluetooth®, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

ASPECTS

Aspect 1. A unified transformer-based visual place recognition (VPR) training framework, comprising:
a trainable feature retrieval transformer module to:
extract global features and local features from a query image,
extract global features and local features from references images, and
train a global retrieval transformer based on the extracted global features from the query image and the extracted global features from the reference images; and
a trainable re-ranking transformer module to:
train at least one re-ranking transformer based on the extracted local features from the query image and the extracted local features from the reference images.

Aspect 2. The unified transformer-based VPR training framework of Aspect 1, wherein the trainable feature retrieval transformer module is to extract global features from the query image by:
encoding a class token, and
converting by linear projection the encoded class token into the global features of the query image.

Aspect 3. The unified transformer-based VPR training framework of either Aspect 1 or Aspect 2, wherein the trainable feature retrieval transformer module is to extract local features from the query image by:
converting by linear projection patches of the query image into corresponding patch tokens;
concatenating the respective patch tokens to corresponding position vectors;
encoding the respective concatenated patch tokens and corresponding position vectors; and
converting by linear projection the encoded patch tokens and corresponding position vectors into linear feature tokens corresponding to the query image.

Aspect 4. The unified transformer-based VPR training framework of any of Aspects 1 to 3, wherein the trainable feature retrieval transformer module is to extract global features from a respective one of the reference images by:
encoding a class token, and
converting by linear projection the encoded class token into the global features of the respective reference image.

Aspect 5. The unified transformer-based VPR training framework of any of Aspects 1 to 4, wherein the trainable feature retrieval transformer module is to extract local features from a respective one of the reference images by:
converting by linear projection patches of the respective reference image into corresponding patch tokens;
concatenating the respective patch tokens to corresponding position vectors;
encoding the respective concatenated patch tokens and corresponding position vectors; and
converting by linear projection the encoded patch tokens and corresponding position vectors into linear feature tokens corresponding to the respective reference image.

Aspect 6. The unified transformer-based VPR training framework of any of Aspects 1 to 5, wherein the trainable re-ranking transformer module is to train the at least one re-ranking transformer by:

reducing a number of the linear feature tokens corresponding to the query image to a fixed number relative to a fixed number of dimensions;

reducing a number of the linear feature tokens corresponding to the respective reference image to a fixed number relative to a fixed number of dimensions;

generating a correlation matrix based on the reduced number of linear feature tokens corresponding to the query image and the reduced number of linear feature tokens corresponding to the respective reference image.

identifying a predefined number of linear feature tokens corresponding to the query image and a predefined number of linear feature tokens corresponding to the respective reference image that match each other;

concatenating the identified linear feature tokens corresponding to the query image and the identified linear feature tokens corresponding to the respective reference image;

converting by linear projection the concatenated linear feature tokens;

transforming the converted linear feature tokens to generate a correlation index for a match between respective ones of the identified linear feature tokens corresponding to the query image and the identified linear feature tokens corresponding to the respective reference image match.

Aspect 7. The unified transformer-based VPR training framework of any of Aspects 1 to 6, wherein the transforming includes:

extracting particular information from the identified linear feature tokens corresponding to the query image;

extracting particular information from the identified linear feature tokens corresponding to the respective reference image;

aggregating the particular information from the converted linear feature tokens as a single vector; and converting the single vector into channels as a binary classification.

Aspect 8. The unified transformer-based VPR training framework of any of Aspects 1 to 7, wherein the reducing of the number of the linear feature tokens corresponding to the query image to the fixed number relative to a fixed number of dimensions is based on a generated attention map of the query image.

Aspect 9. The unified transformer-based VPR training framework of any of Aspects 1 to 8, wherein the reducing of the number of the linear feature tokens corresponding to the respective reference image to the fixed number relative to a fixed number of dimensions is based on a generated attention map of the respective reference image.

Aspect 10. A method of training a unified transformer-based visual place recognition (VPR) framework, comprising:

encoding linear representations of portions of a query image;

encoding a randomly initiated class token of the query image;

encoding linear representations of portions of a reference image;

encoding a randomly initiated class token of the reference image;

training a global retrieval transformer based on the encoded class token of the query image and the encoded class token of the reference image; and training at least one re-ranking transformer based on at least a portion of the encoded linear representations of portions of the query image and a portion of the encoded linear representations of the reference image.

Aspect 11. The method of Aspect 10, wherein the training of the at least one re-ranking transformer includes:

reducing a number of the encoded linear representations of the portions of the query image based on an attention map of the query image to a fixed number; and reducing a number of the encoded linear representations of the portions of the representative image based on an attention map of the reference image to the fixed number.

Aspect 12. The method of Aspect 10 or Aspect 11, further comprising:

combining the encoded linear representations of the portions of the query image and the encoded linear representations of the portions of the representative image into a correlation index;

identifying a predefined number of the encoded linear representations of the portions of the query image and the encoded linear representations of the portions of the representative image that match; and generating a re-ranking score for the matches by transforming a combined linear representation of the identified encoded linear representations of the portions of the query image and the encoded linear representations of the portions of the representative image that match.

Aspect 13. A unified global retrieval and re-ranking framework for implementing visual place recognition (VPR), comprising:

a global retrieval module that is trained by an encoded class token having global features of a query image and by an encoded class token having global features of a reference image; and a re-ranking module that is trained by encoded patch tokens having local features of the query image and by encoded patch tokens having local features of the reference image.

Aspect 14. A media platform having computer-executable components or modules stored therein that, when executed, perform operations to implement visual place recognition (VPR) by executing the method of any of Aspects 10 to 12.

Aspect 15. A computer-readable medium for storing executable instructions that, when executed, cause one or more processors to perform functions related to training a feature retrieval transformer module, the functions comprising:

extracting global features and local features from a query image;

extracting global features and local features from references images; and training a global retrieval transformer based on the extracted global features from the query image and the extracted global features from the reference images.

Aspect 16. The computer-readable medium of Aspect 15, wherein the extracting of global features from the query image includes:

encoding a class token, and converting by linear projection the encoded class token into the global features of the query image; and wherein the extracting of local features from the query image includes:

converting by linear projection patches of the query image into corresponding patch tokens;

concatenating the respective patch tokens to corresponding position vectors;

encoding the respective concatenated patch tokens and corresponding position vectors; and converting by linear projection the encoded patch tokens and corresponding position vectors into linear feature tokens corresponding to the query image.

Aspect 17. The computer-readable medium of Aspect 15 or Aspect 16, wherein the extracting of global features from a respective one of the reference images includes:

encoding a class token, and converting by linear projection the encoded class token into the global features of the respective reference image; and wherein the extracting of local features from the respective one of the reference images includes:

converting by linear projection patches of the respective reference image into corresponding patch tokens;

concatenating the respective patch tokens to corresponding position vectors;

encoding the respective concatenated patch tokens and corresponding position vectors; and converting by linear projection the encoded patch tokens and corresponding position vectors into linear feature tokens corresponding to the respective reference image.

Aspect 18. A computer-readable medium for storing executable instructions that, when executed, cause one or more processors to perform functions related to training a re-ranking transformer module, the functions comprising:

reducing a number of the linear feature tokens corresponding to the query image to a fixed number relative to a fixed number of dimensions based on a generated attention map of the query image;

reducing a number of the linear feature tokens corresponding to the respective reference image to a fixed number relative to a fixed number of dimensions based on a generated attention map of the respective reference image;

generating a correlation matrix based on the reduced number of linear feature tokens corresponding to the query image and the reduced number of linear feature tokens corresponding to the respective reference image;

identifying a predefined number of linear feature tokens corresponding to the query image and a predefined number of linear feature tokens corresponding to the respective reference image that match each other;

concatenating the identified linear feature tokens corresponding to the query image and the identified linear feature tokens corresponding to the respective reference image;

converting by linear projection the concatenated linear feature tokens;

transforming the converted linear feature tokens to generate a re-ranking score for a match between respective ones of the identified linear feature tokens corresponding to the query image and the identified linear feature tokens corresponding to the respective reference image match.

Aspect 19. The computer-readable medium of Aspect 18, wherein the transforming of the converted linear feature tokens includes:

extracting particular information from the identified linear feature tokens corresponding to the query image;

extracting particular information from the identified linear feature tokens corresponding to the respective reference image;

aggregating the particular information from the converted linear feature tokens as a single vector; and converting the single vector into channels as a binary classification.

What is claimed:

1. A unified transformer-based visual place recognition (VPR) training system, comprising:

a feature retrieval transformer model configured to:

extract global features and local features from a query image, extract global features and local features from reference images, and train a global retrieval transformer based on the extracted global features from the query image and the extracted global features from the reference images; and a re-ranking transformer model configured to:

train at least one re-ranking transformer based on the extracted local features from the query image and the extracted local features from the reference images by:

reducing a number of linear feature tokens corresponding to the query image to a fixed number relative to a fixed number of dimensions;

reducing a number of linear feature tokens corresponding to a respective reference image to a fixed number relative to a fixed number of dimensions;

generating a correlation matrix based on the reduced number of linear feature tokens corresponding to the query image and the reduced number of linear feature tokens corresponding to the respective reference image;

identifying a predefined number of linear feature tokens corresponding to the query image and a predefined number of linear feature tokens corresponding to the respective reference image that match each other;

concatenating identified linear feature tokens corresponding to the query image and identified linear feature tokens corresponding to the respective reference image;

converting by linear projection the concatenated identified linear feature tokens; and transforming the converted concatenated identified linear feature tokens to generate a re-ranking score for a match between respective ones of the identified linear feature tokens corresponding to the query image and the identified linear feature tokens corresponding to a respective reference image match.

2. The unified transformer-based VPR training system of claim 1, wherein the feature retrieval transformer model is configured to extract the global features from the query image by:

encoding a class token, and converting by linear projection the encoded class token into the global features of the query image.

3. The unified transformer-based VPR training system of claim 1, wherein the feature retrieval transformer model is configured to extract local features from the query image by:

converting by linear projection patches of the query image into corresponding patch tokens;

concatenating respective corresponding patch tokens to corresponding position vectors;

encoding, as encoded patch tokens respective concatenated respective corresponding patch tokens and the corresponding position vectors; and converting by linear projection the encoded patch tokens and the corresponding position vectors into linear feature tokens corresponding to the query image.

4. The unified transformer-based VPR training system of claim 1, wherein the feature retrieval transformer model is configured to extract global features from a respective one of the reference images by:

encoding a class token, and converting by linear projection the encoded class token into the global features of the respective reference image.

5. The unified transformer-based VPR training system of claim 1, wherein the feature retrieval transformer model is configured to extract local features from a respective one of the reference images by:

converting by linear projection patches of the respective reference image into corresponding patch tokens;

concatenating respective patch tokens to corresponding position vectors;

encoding, as encoded patch tokens, respective concatenated respective patch tokens and corresponding position vectors; and converting by linear projection the encoded patch tokens and corresponding position vectors into linear feature tokens corresponding to the respective reference image.

6. The unified transformer-based VPR training system of claim 1, wherein the transforming of the converted concatenated identified linear feature tokens includes:

extracting information from the identified linear feature tokens corresponding to the query image;

extracting information from the identified linear feature tokens corresponding to the respective reference image;

aggregating the information from the converted concatenated identified linear feature tokens as a single vector; and converting the single vector into channels as a binary classification.

7. The unified transformer-based VPR training system of claim 1, wherein the reducing of the number of the linear feature tokens corresponding to the query image to the fixed number relative to the fixed number of dimensions is based on a generated attention map of the query image.

8. The unified transformer-based VPR training system of claim 1, wherein the reducing of the number of the linear feature tokens corresponding to the respective reference image to the fixed number relative to the fixed number of dimensions is based on a generated attention map of the respective reference image.

9. The unified transformer-based VPR training system of claim 1, wherein:

the feature retrieval transformer model is trained by an encoded class token having global features of the query image and by an encoded class token having global features of the reference image; and wherein the re-ranking transformer model is trained by encoded patch tokens having the local features from the query image and by encoded patch tokens having the local features from the reference image.

10. A method of training a unified transformer-based visual place recognition (VPR) framework, comprising:

encoding linear representations of portions of a query image;

encoding a randomly initiated class token of the query image;

encoding linear representations of portions of a reference image;

encoding a randomly initiated class token of the reference image;

training a global retrieval transformer based on the encoded class token of the query image and the encoded class token of the reference image; and training at least one re-ranking transformer based on at least a portion of the encoded linear representations of portions of the query image and a portion of the encoded linear representations of the reference image by:

reducing a number of the encoded linear representations of the portions of the query image based on an attention map of the query image to a fixed number; and reducing a number of the encoded linear representations of the portions of the reference image based on an attention map of the reference image to the fixed number;

combining the encoded linear representations of the portions of the query image and the encoded linear representations of the portions of the reference image into a correlation index;

identifying a predefined number of the encoded linear representations of the portions of the query image and the encoded linear representations of the portions of the reference image that match; and generating a re-ranking score for the predefined number matches by transforming a combined linear representation of the identified predefined number of the encoded linear representations of the portions of the query image and the encoded linear representations of the portions of the reference image that match.

11. A media platform having non-transitory computer-executable components stored therein that, when executed, perform operations to implement visual place recognition (VPR) by executing a method comprising: encoding linear representations of portions of a query image;

encoding a randomly initiated class token of the query image;

encoding linear representations of portions of a reference image;

encoding a randomly initiated class token of the reference image;

training a global retrieval transformer based on the encoded class token of the query image and the encoded class token of the reference image; and training at least one re-ranking transformer based on at least a portion of the encoded linear representations of portions of the query image and a portion of the encoded linear representations of the reference image by:

reducing a number of the encoded linear representations of the portions of the query image based on an attention map of the query image to a fixed number; and reducing a number of the encoded linear representations of the portions of the reference image based on an attention map of the reference image to the fixed number;

combining the encoded linear representations of the portions of the query image and the encoded linear representations of the portions of the reference image into a correlation index;

identifying a predefined number of the encoded linear representations of the portions of the query image and the encoded linear representations of the portions of the reference image that match; and generating a re-ranking score for the predefined number matches by transforming a combined linear representation of the identified predefined number of the encoded linear representations of the portions of the query image and the encoded linear representations of the portions of the reference image that match.

12. A non-transitory computer-readable medium for storing executable instructions that, when executed, cause one or more processors to perform functions related to training a feature retrieval transformer model, the functions comprising:

extracting global features and local features from a query image;

extracting global features and local features from reference images; and training a global retrieval transformer based on the extracted global features from the query image and the extracted global features from the reference images;

reducing a number of linear feature tokens corresponding to the query image to a fixed number relative to a fixed number of dimensions;

reducing a number of linear feature tokens corresponding to a respective reference image to a fixed number relative to a fixed number of dimensions;

generating a correlation matrix based on the reduced number of linear feature tokens corresponding to the query image and the reduced number of linear feature tokens corresponding to the respective reference image;

identifying a predefined number of linear feature tokens corresponding to the query image and a predefined number of linear feature tokens corresponding to the respective reference image that match each other;

concatenating identified linear feature tokens corresponding to the query image and identified linear feature tokens corresponding to the respective reference image;

converting by linear projection the concatenated identified linear feature tokens; and transforming the converted concatenated identified linear feature tokens to generate a re-ranking score for a match between respective ones of the identified linear feature tokens corresponding to the query image and the identified linear feature tokens corresponding to a respective reference image match.

13. The computer-readable medium of claim 12, wherein the extracting of global features from the query image includes:

encoding a class token, and converting by linear projection the encoded class token into the global features of the query image; and wherein the extracting of local features from the query image includes:

converting by linear projection patches of the query image into corresponding patch tokens;

concatenating respective patch tokens to corresponding position vectors;

encoding, as encoded patch tokens, respective concatenated respective patch tokens and corresponding position vectors; and converting by linear projection the encoded patch tokens and corresponding position vectors into linear feature tokens corresponding to the query image.

14. The computer-readable medium of claim 12, wherein the extracting of global features from a respective one of the reference images includes:

encoding a class token, and converting by linear projection the encoded class token into the global features of the respective reference image; and wherein the extracting of local features from a respective one of the reference images includes:

converting by linear projection patches of the respective reference image into corresponding patch tokens;

concatenating respective corresponding patch tokens to corresponding position vectors;

encoding, as encoded patch tokens, respective concatenated respective corresponding patch tokens and corresponding position vectors; and converting by linear projection the encoded patch tokens and corresponding position vectors into linear feature tokens corresponding to the respective reference image.

15. A non-transitory computer-readable medium for storing executable instructions that, when executed, cause one or more processors to perform functions related to training a re-ranking transformer module, the functions comprising:

reducing a number of linear feature tokens corresponding to a query image to a fixed number relative to a fixed number of dimensions based on a generated attention map of the query image;

reducing a number of the linear feature tokens corresponding to a respective reference image to a fixed number relative to a fixed number of dimensions based on a generated attention map of the respective reference image;

generating a correlation matrix based on the reduced number of linear feature tokens corresponding to the query image and the reduced number of linear feature tokens corresponding to the respective reference image;

identifying a predefined number of linear feature tokens corresponding to the query image and a predefined number of linear feature tokens corresponding to the respective reference image that match each other;

concatenating identified linear feature tokens corresponding to the query image and identified linear feature tokens corresponding to the respective reference image;

converting by linear projection the concatenated identified linear feature tokens; and transforming the converted concatenated identified linear feature tokens to generate a re-ranking score for a match between respective ones of the identified linear feature tokens corresponding to the query image and the identified linear feature tokens corresponding to a respective reference image match.

16. The computer-readable medium of claim 15, wherein the transforming of the converted concatenated linear feature tokens includes:

extracting information from the identified linear feature tokens corresponding to the query image;

extracting information from the identified linear feature tokens corresponding to the respective reference image;

aggregating the information from the converted concatenated identified linear feature tokens as a single vector; and converting the single vector into channels as a binary classification.

\* \* \* \* \*